July 1, 1924.
D. J. McDOUGAL
1,499,675
AUTOMOBILE SUSPENSION
Filed Nov. 28, 1921
2 Sheets-Sheet 1
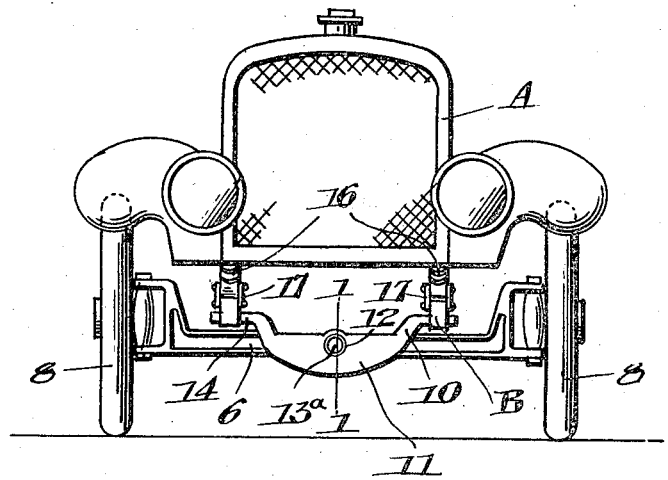
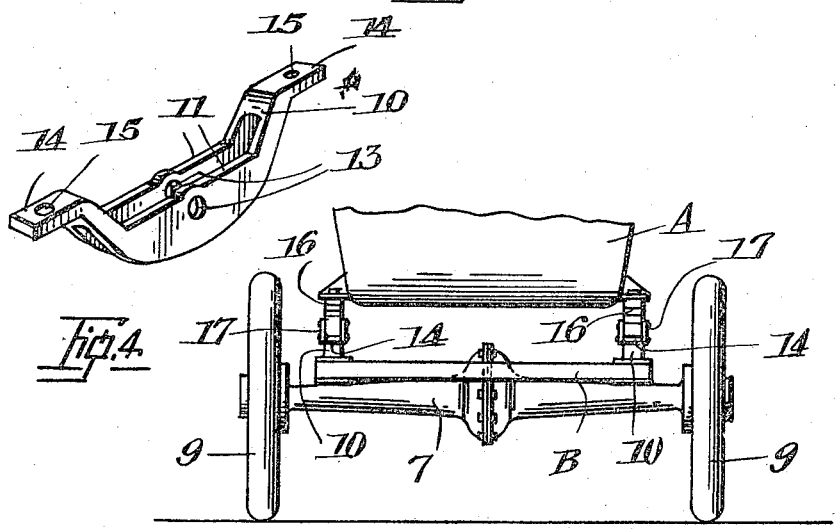
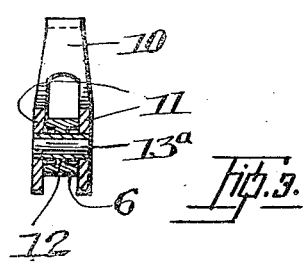
INVENTOR
DONALD J. McDOUGAL.

Patented July 1, 1924.

1,499,675

UNITED STATES PATENT OFFICE.

DONALD JOSEPH McDOUGAL, OF OTTAWA, ONTARIO, CANADA.

AUTOMOBILE SUSPENSION.

Application filed November 28, 1921. Serial No. 518,410.

*To all whom it may concern:*

Be it known that I, DONALD JOSEPH MC-DOUGAL, a subject of the King of Great Britain, and resident of the city of Ottawa, in the Province of Ontario, and Dominion of Canada, have invented certain new and useful Improvements in Automobile Suspensions, of which the following is a specification.

This invention relates to improvements in front spring suspensions for vehicles or the like, and the objects of the invention are to provide a simple, durable and economical device of this description particularly adaptable for use in connection with motor vehicles and which will ensure complete freedom of movement of the front axle over rough roads.

A further object is to provide a device of this class that will act as a cushion, so to speak, for all shocks or jars received from holes or bumps and uneven road or track surfaces generally by a motor car.

A still further object is to provide a device of this character that will retain the body of the car on a level keel even when the front axle is on a slope through one wheel crossing a bump, hole or mound.

With these and other objects in view, the invention consists essentially in the combination with the front wheel axle, of a frame supporting member centrally and pivotally mounted thereon provided with arms adapted to support a vehicle frame.

Referring to the drawings, in which like characters of reference indicate corresponding parts in each figure, and in which:

Figure 1 is a front elevation, showing my device constituting one point of suspension for the front axle.

Figure 2 is an end view showing the two points of suspension from the rear axle.

Figure 3 is a section on the line 1—1, Figure 1.

Figure 4 is a perspective view of the suspension member.

In the drawings:

Figure 6:
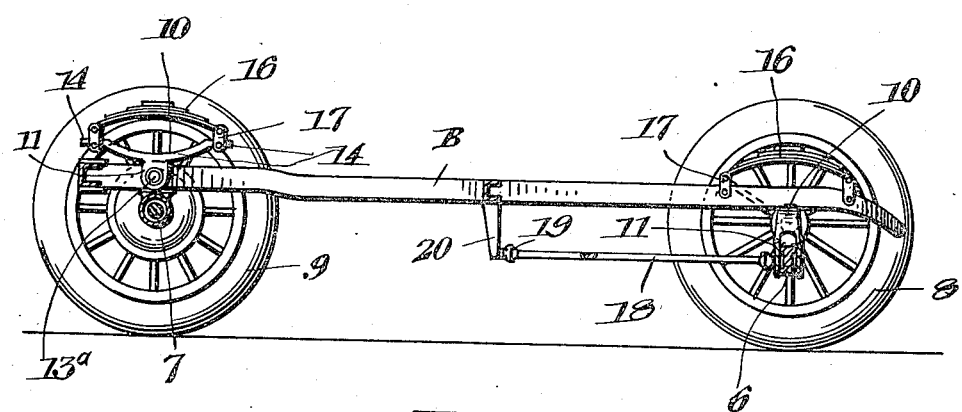
Figure 6 is a section on the line 5—5, Figure 5.
Figure 5:
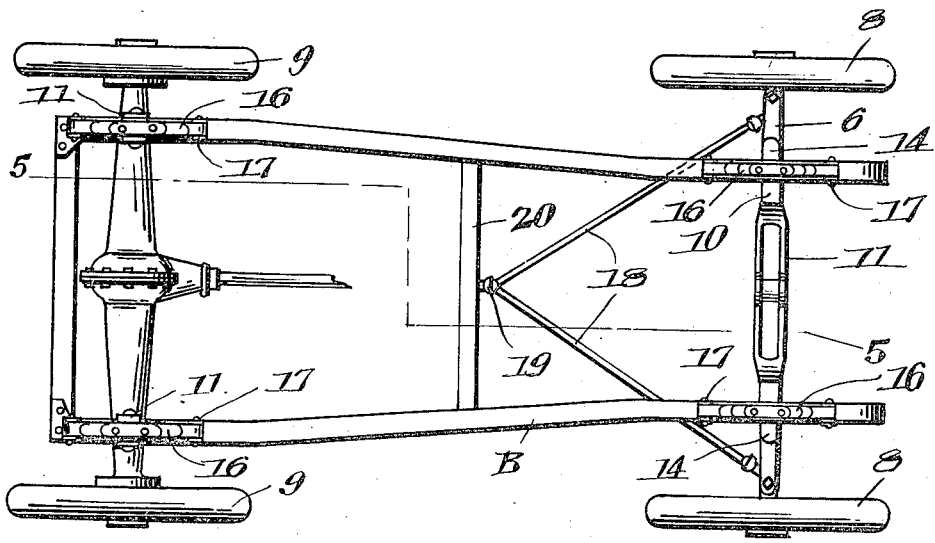
Figure 5 is a top plan view, showing the auxiliary supporting rods for the front axle.

A is the body of an automobile and B, the chassis or frame, provided with front and rear axles 6 and 7, having mounted thereon in any well-known manner the front and rear wheels 8 and 9 respectively. 10 is a supporting member or casing, here shown in double formation with a spaced body portion 11. It may here, however, be mentioned that I do not confine myself to this construction and that most satisfactory results can be obtained with my device in single form.

The front axle 6 is provided with a central aperture 12 therein. The supporting member 11 is adapted to fit the front axle 6 (as shown in Figure 1) and is provided with apertures 13 therein adapted to register with the aperture 12 in the axle 6 and to receive therethrough the pivotally supporting means $13^a$ whereby said member is adapted to pivotally operate on said axle. The member 11 is formed with lateral extensions or arms 14 provided with apertures 15 therein and adapted to support the ends of the vehicle frame B.

Similarly formed balancing and suspension members 11 are pivotally mounted in any well known manner at $13^a$ on the rear portion of the chassis B on each side immediately above the rear axle and substantially at right angles to the member 11 on the front axle. The supporting members 11 on the chassis B are designed to engage at each end with the ends of the springs 16 on which is mounted the vehicle body A. These rear balancing and suspension members form, with the front balancing and suspension member, a three-point suspension.

16 are the springs of any suitable make vertically arranged between the vehicle body A and the frame B and suitably connected to the latter by means of shackles 17. 18 are reinforcing bars adapted to steady the front axle 6, converging at their inner ends to be socket-connected at 19 to a suitable crossbar 20 on the frame B, and secured at their outer ends to the front axle adjacent to the ends thereof.

From the foregoing, the operation of my device will be clearly evident, illustrating as it does the three-point suspension for a vehicle body, two suspension points at the rear and one suspension point in the front centred in my improved device, which constitutes most efficient shock and jar absorbing means and further provides play for the front axle in crossing bumps or holes and the like.

The auxiliary reinforcing means in the shape of the rods adapted to steady the axle are also to be noted, particularly in the case of bad jars on uneven roads. Taken altogether, my improved three-point suspension means gives the most satisfactory results in resiliency, by keeping the body of the car over all ordinary obstructions on an even keel.

As many changes could be made in the above constructions and many apparently widely different embodiments of my invention within the scope of the claims, constructed without departing from the spirit or scope therof, it is intended that all matter contained in the accompanying specification and drawings shall be interpreted as illustrative and not in a limiting sense.

What I claim as my invention is:

1. Automobile suspension means of the character described comprising balancing and supporting castings formed with central apertures therein, one of said castings being pivotally mounted on the front axle, the others of said castings being similarly mounted at right angles to the front axle casting and on each side of the chassis above the rear axle, and spring means between the latter castings and the vehicle body.

2. In means of the character described, the combination with a vehicle body, of a chassis, a balancing and supporting member pivotally mounted on and longitudinally of the front axle and adapted to swingingly support the chassis front, similar balancing and supporting members pivotally mounted on each side of the chassis above the rear axle and adapted, in combination with spring means, to support the vehicle body and whereby, in combination, a three-point suspension is provided.

3. Automobile suspension means comprising balancing and supporting members pivotally mounted on the front axle and pivotally mounted on each side of the chassis above the rear axle, spring means between the latter of said members and the vehicle body and spring means between the chassis front and the vehicle body, whereby, in combination with said balancing and supporting members, a three-point suspension is provided for said body.

In witness whereof I have hereunto set my hand.

DONALD JOSEPH McDOUGAL.